(12) United States Patent
Lindblom

(10) Patent No.: US 11,440,181 B2
(45) Date of Patent: Sep. 13, 2022

(54) PLANETARY GEAR TRAIN, GEARBOX AND INDUSTRIAL ROBOT

(71) Applicant: ABB Schweiz AG, Baden (CH)

(72) Inventor: Per Lindblom, Stockholm (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/291,866

(22) PCT Filed: Nov. 19, 2018

(86) PCT No.: PCT/EP2018/081770
§ 371 (c)(1),
(2) Date: May 6, 2021

(87) PCT Pub. No.: WO2020/104006
PCT Pub. Date: May 28, 2020

(65) Prior Publication Data
US 2022/0009089 A1    Jan. 13, 2022

(51) Int. Cl.
*F16H 1/28* (2006.01)
*B25J 9/10* (2006.01)
*F16H 1/32* (2006.01)

(52) U.S. Cl.
CPC ............ *B25J 9/103* (2013.01); *F16H 1/2827* (2013.01); *F16H 1/2863* (2013.01); *F16H 1/32* (2013.01); *F16H 2001/327* (2013.01)

(58) Field of Classification Search
CPC .... F16H 1/2827; F16H 1/2863; F16H 57/082; F16H 2057/127; F16H 2057/128; F16H 1/28
See application file for complete search history.

(56) References Cited

U.S. PATENT DOCUMENTS 3,269,738 A * 8/1966 Baumler .................. F16J 15/36
                                                        277/383
6,558,289 B2 * 5/2003 Chung .................. B60W 10/06
                                                        477/3
(Continued)

FOREIGN PATENT DOCUMENTS

CN        102162505 A      8/2011
CN        206617556 U  *  11/2017  ............... F16H 1/28
(Continued)

OTHER PUBLICATIONS

International Preliminary Report on Patentability; Application No. PCT/EP2018/081770; dated May 25, 2021; 6 Pages.
(Continued)

*Primary Examiner* — Huan Le
(74) *Attorney, Agent, or Firm* — Whitmyer IP Group LLC

(57) ABSTRACT

A planetary gear train including a ring gear defining a central axis; a plurality of planet gears, each planet gear being rotatable about a respective planet axis and meshing with the ring gear, and each planet gear including a conical and helical planet gear toothing defining a conical direction; a planet carrier rotationally supporting the planet gears for rotation about the planet axes, the planet carrier being axially displaceable along the central axis; and a carrier forcing device arranged to force the planet carrier along the central axis in the conical direction. A gearbox for an industrial robot, the gearbox including a planetary gear train, and an industrial robot including a planetary gear train or a gearbox, are also provided.

20 Claims, 6 Drawing Sheets

(56) References Cited

U.S. PATENT DOCUMENTS

| | | | |
|---|---|---|---|
| 9,631,702 | B2 | 4/2017 | Chhour |
| 2015/0135874 | A1 | 5/2015 | Kato |
| 2016/0069424 | A1 | 3/2016 | Chhour |
| 2017/0227093 | A1* | 8/2017 | Matsumoto ........... F16H 1/2863 |

FOREIGN PATENT DOCUMENTS

| | | |
|---|---|---|
| CN | 206617556 U | 11/2017 |
| CN | 107548443 A | 1/2018 |
| CN | 107750313 A | 8/2018 |
| DE | 102010046958 A1 | 4/2011 |
| DE | 102014117646 A1 | 6/2016 |
| EP | 2693079 A2 | 2/2014 |
| EP | 2693079 B1 | 9/2016 |
| WO | 2016193286 A1 | 12/2016 |
| WO | 2017046767 A1 | 3/2017 |

OTHER PUBLICATIONS

Höhn, Bernd Robert, et al.; "Precision Involute Gearboxes", Applied Mechanics and Materials, vol. 86, Trans Tech Publications, Ltd.; Aug. 16, 2011; 1 Page; Crossref, doi:10.4028/www.scientific.net/amm.86.570.

International Search Report and Written Opinion of the International Searching Authority; Application No. PCT/EP2018/081770; Completed: Jul. 8, 2019; dated Jul. 16, 2019; 22 Pages.

Chinese Office Action and search report; Application No. 2018800994. X; dated May 10, 2022; 10 Pages.

\* cited by examiner

PLANETARY GEAR TRAIN, GEARBOX AND INDUSTRIAL ROBOT

TECHNICAL FIELD

The present disclosure generally relates to a planetary gear train. In particular, a planetary gear train comprising a carrier forcing device arranged to force a planet carrier, a gearbox for an industrial robot, which gearbox comprises a planetary gear train, and an industrial robot comprising a planetary gear train or a gearbox, are provided.

BACKGROUND

Electric motors are commonly used to drive joints of industrial robots. The electric motors are cheap and compatible with electrical control systems. The relatively low torque and relatively high speed characteristic of electric motors is however contrary to the requirements of high torque and low speed actuation of joints in an industrial robot, and a speed reducing transmission is therefore required. Gearboxes always have a certain error due to, for example, manufacturing errors, manufacturing tolerances, wear and assembly needs. This results in imprecise motion and non-linear behavior, such as hysteresis and backlash. When controlling an industrial robot, the largest errors and non-linear behavior typically result from the gearbox.

A typical drive solution for robotic applications is to use an electric motor in conjunction with a harmonic Drive® reduction gear or an RV® reduction gear. These reduction gears are however relatively expensive, complicated and sensitive to assembly tolerances.

EP 2693079 A2 discloses a gear having a control device for producing an axial active force and/or an axial displacement such that a conical toothing of a two-stage planetary wheel is adjustable and/or pretensionable axially opposite to a conical toothing of a ring gear so that the conical teeth of the planetary wheel and the ring gear engage into each other during operation. The planetary wheel includes the conical toothing, which forms a stage and combs with the ring gear, and a cylindrical toothing, which forms another stage and combs with a toothing of a sleeve shaft.

SUMMARY

One object of the present disclosure is to provide a planetary gear train having an improved efficiency, such as reduced friction losses, reduced backlash and/or reduced hysteresis.

A still further object of the present disclosure is to provide a planetary gear train having a precise performance.

A still further object of the present disclosure is to provide a planetary gear train that is less sensitive to assembly tolerances.

A still further object of the present disclosure is to provide a planetary gear train with simplified maintenance, such as simplified maintenance operations and/or reduced requirements of maintenance.

A still further object of the present disclosure is to provide a planetary gear train that is compact.

A still further object of the present disclosure is to provide a planetary gear train that has a cheap design.

A still further object of the present disclosure is to provide a planetary gear train that solves several or all of the foregoing objects in combination.

A still further object of the present disclosure is to provide a gearbox for an industrial robot, which gearbox comprises a planetary gear train and solves one, several or all of the foregoing objects.

A still further object of the present disclosure is to provide an industrial robot comprising a planetary gear train or a gearbox comprising a planetary gear train, which industrial robot solves one, several or all of the foregoing objects.

According to one aspect, there is provided a planetary gear train comprising a ring gear defining a central axis; a plurality of planet gears, each planet gear being rotatable about a respective planet axis and meshing with the ring gear, and each planet gear comprising a conical and helical planet gear toothing defining a conical direction; a planet carrier rotationally supporting the planet gears for rotation about the planet axes, the planet carrier being axially displaceable along the central axis; and a carrier forcing device arranged to force the planet carrier along the central axis in the conical direction.

Throughout the present disclosure, a conical direction of a conical gear is a direction parallel with the rotational axis of the gear, from the larger side of the gear towards the smaller side of the gear, i.e. towards an apex of an imaginary cone of which the gear forms a conical frustum. A base direction of a conical gear is directed opposite to the conical direction, i.e. the base direction is directed towards a base of an imaginary cone of which the gear forms a conical frustum.

When the driving torque is low, the planet carrier is forced in the conical direction by means of the carrier forcing device. At low torque the planet gears are in double flank contact with the ring gear due to the conicity of the planet gears. As a consequence, the backlash is eliminated at low torque. In double flank contact, both working flanks and non-working flanks are in contact.

When the planet gears accelerate and inertia forces of the planet gears increase, resulting in a total higher transferred torque, the helical planet gear toothing of each planet gear generates an axial force in the base direction. This axial force from the planet gears causes the planet carrier to move in the base direction against the force of the carrier forcing device. Due to the helicity of the planet gears, the planet gears move in the base direction during acceleration until the double flank contact with the ring gear switches to a single flank contact. In single flank contact, a gap is established between the non-working flanks. Thereby, friction losses due to the double contact is reduced at higher torque. This improves the efficiency of the planetary gear train. The planetary gear train thus constitutes a high precision transmission with low backlash and high precision at low torque, and low losses and maintained precision at high torque.

Furthermore, since the carrier forcing device is arranged to force the planet carrier, and thereby also the planet gears supported by the planet carrier, the force exerted on each planet gear can be adjusted by only adjusting the carrier forcing device. The planetary gear train according to the present disclosure is thereby simple to adjust.

In addition, the provision of the carrier forcing device arranged to force the planet carrier along the central axis in the conical direction generates a self-adjusting effect of the planet gears. That is, the load distribution between the planet gears is automatically equalized, or substantially equalized.

The axially displaceable planet carrier may be referred to as an axially floating planet carrier. Each planet gear may be axially locked relative to the planet carrier. Alternatively, one or more of the planet gears may be axially floating relative to the planet carrier, i.e. axially displaceable along its respective planet axis.

The planetary gear train may further comprise a sun gear. The planet gears may mesh with both the sun gear and the ring gear. The planet carrier may be rotatable about the central axis. In this case, either the sun gear or the ring gear may be stationary. The ring gear may comprise a conical and helical ring gear toothing corresponding to the planet gear toothing and the sun gear may comprise a conical and helical sun gear toothing corresponding to the planet gear toothing.

In case the sun gear is stationary, the ring gear may constitute, or be fixedly connected with, an output member. Thus, the planet carrier may be the input, the ring gear may be the output, and the sun gear may be stationary. In case the ring gear is stationary, the planet carrier may constitute, or be fixedly connected with, an output member. Thus, the sun gear may be the input, the planet carrier may be the output, and the ring gear may be stationary. In any case, the output member may be constituted by an output shaft or an output flange. As used herein, a stationary member is stationary with respect to a housing of the planetary gear train, and is not necessarily stationary in space.

Throughout the present disclosure, the planetary gear train may be a reduction gear train. Alternatively, or in addition, the planetary gear train may be hollow along the central axis, e.g. for feed-through of cables. Furthermore, the planetary gear train may alternatively be referred to as an epicyclic gear train.

The planetary gear train may comprise involute gears. Thus, each of the planet gears, and the gears meshing with the planet gears (e.g. ring gear and sun gear), may be involute gears.

The helix angle of the planet gear toothing may be selected based on the driving torque and based on the force from the carrier forcing device. In this way, the axial forces from the planet gears due to their helicity and the axial force from the carrier forcing device can be balanced.

The planet gear toothing may have a helix angle of 0.5 to 8 degrees, such as 1 to 5 degrees, such as 2 to 4 degrees. The helix angle may alternatively be referred to as a helical angle. The one or more toothings meshing with the planet gear toothing may comprise substantially the same, or the same, helix angle as the planet gear toothing.

Conical gears are gears with continuously varying profile displacement along the tooth width. The planet gear toothing may have a conicity of 1 to 4 degrees, such as approximately 2 degrees, or 2 degrees. The one or more toothings meshing with the planet gear toothing may comprise substantially the same, or the same, conicity as the planet gear toothing. The conicity may alternatively be referred to as a cone angle.

The carrier forcing device may comprise, or be constituted by, a spring. The spring may encircle the central axis. This contributes to a compact design of the planetary gear train.

The spring may be a disc spring. A disc spring is compact and can provide sufficient axial displacement of the planet carrier along the central axis. According to one example, the disc spring is a Belleville washer. Alternatively, the spring may be a coil spring.

The spring may be preloaded. The preloading may be a compression of the spring such that the spring pushes the planet carrier in the conical direction. Alternatively, the preloading may be an extension of the spring such that the spring pulls the planet carrier in the conical direction.

The planetary gear train may further comprise a stopping structure configured to limit axial displacement of the planet carrier in the base direction along the central axis. Alternatively, or in addition, the planetary gear train may further comprise at least one stopping structure configured to limit axial displacement of each planet gear in the base direction along the associated planet axis. In any case, the stopping structure may be arranged such that a single flank contact between the planet gears and the ring gear is maintained, i.e. such that the planet gears are not entirely separated from the ring gear. The stopping structure for the planet gears and/or for the planet carrier may thus define a maximum distance of displacement of the planet gears relative to the ring gear.

The planetary gear train may further comprise a stationary part. In this case, the carrier forcing device may be arranged between the stationary part and the planet carrier. The stationary part may be stationary with respect to a housing of the planetary gear train, e.g. a housing of a gearbox. The planetary gear train may further comprise a bearing between the carrier forcing device and the planet carrier.

At least one of the planet gears may be axially displaceable along its planet axis relative to the planet carrier. In this case, the planetary gear train may further comprise at least one planet forcing device arranged to force the at least one axially displaceable planet gear along the planet axis in the conical $3o$ direction. The at least one planet forcing device may be of the same type as the carrier forcing device, e.g. a disc spring. The provision of one or more axially displaceable planet gears and an associated planet forcing device can in some cases contribute to a more even load distribution between the planet gears.

The ring gear may be rotatable about the central axis. In this case, the ring gear may constitute, or be fixedly connected with, an output member of the planetary gear train.

The planetary gear train may further comprise a sun gear meshing with the planet gears. In this case, either the sun gear or the ring gear may be stationary. In case the ring gear is stationary, the sun gear is rotatable about the central axis, and vice versa.

The planetary gear train may comprise a first planetary gear stage and a second planetary gear stage. The second planetary gear stage may be an output stage, i.e. a last stage. The first planetary gear stage may comprise a first sun gear, first planet gears, a first planet carrier rotationally supporting the first planet gears, and a first ring gear. Each of the first sun gear, the first planet gears and the first ring gear may comprise only involute spur gears. In the first planetary gear stage, the first sun gear may be the input, the planet carrier may be the output and the first ring gear may be stationary.

Alternatively, or in addition, the planetary gear train may comprise a pre-stage. The pre-stage may comprise an input member and a pinion driving the input member. The input member of the pre-stage may comprise a sun gear of the first planetary gear stage. The pre-stage may comprise involute helical gears.

As a further alternative, a planetary gear train according to the present disclosure may comprise only one gear stage. However, the provision of additional gear stages may increase the reduction ratio of the planetary gear train.

The second planetary gear stage may comprise the sun gear and the sun gear may be fixed with the planet carrier of the first planetary gear stage. For example, the sun gear of the second planetary gear stage may be integrally formed with, or fixedly connected to, the planet carrier of the first planetary gear stage. The planet gears comprising the conical and helical planet gear toothing may be provided in the second planetary gear stage, e.g. in a last gear stage of the planetary gear train.

According to a further aspect, there is provided a gearbox for an industrial robot, the gearbox comprising a planetary gear train according to the present disclosure. The gearbox may comprise a housing. The housing, or a part fixed to the housing, may constitute a stationary part according to the present disclosure.

According to a further aspect, there is provided an industrial robot comprising a planetary gear train according to the present disclosure or a gearbox according to the present disclosure. For example, a gearbox according to the present disclosure may be provided at one or more joints of the industrial robot.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
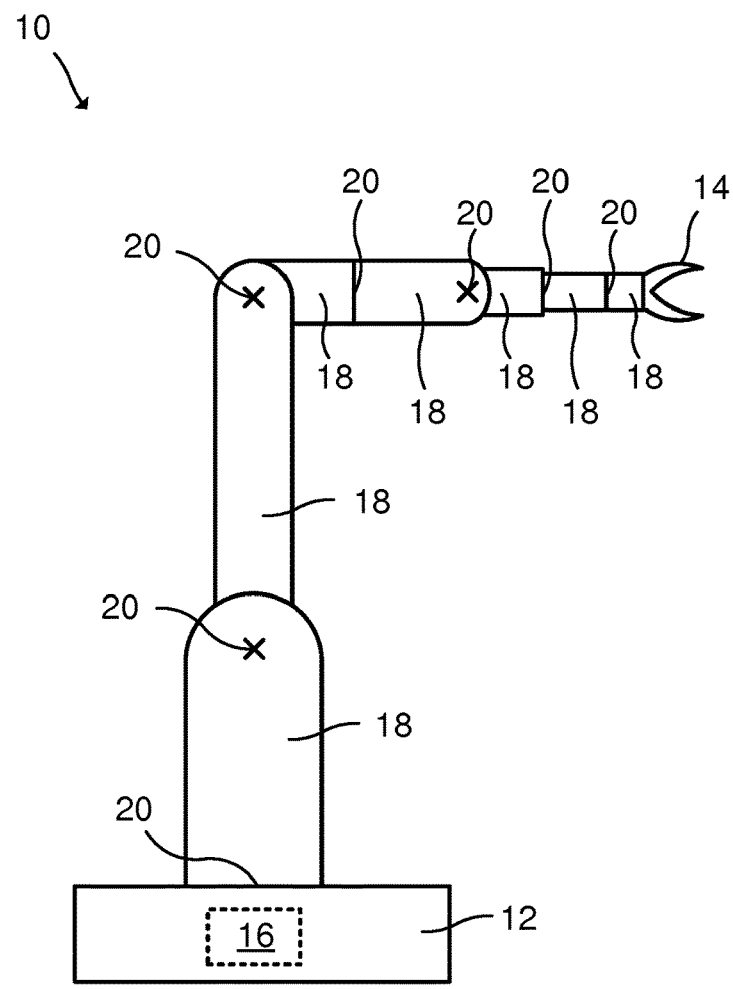
FIG. 1: schematically represents an industrial robot.

In the following, a planetary gear train comprising a carrier forcing device arranged to force a planet carrier, a gearbox for an industrial robot, which gearbox comprises a planetary gear train, and an industrial robot comprising a planetary gear train or a gearbox, will be described. The same reference numerals will be used to denote the same or similar structural features.

FIG. 1 schematically represents an industrial robot 10. The industrial robot 10 of this example comprises a base member 12, a tool 14, and a control system 16, such as a robot controller. The industrial robot 10 further comprises seven link members 18. Each link member 18 is rotationally or translationally movable at a joint 20. The industrial robot 10 may comprise a planetary gear train according to the present disclosure or a gearbox according to the present disclosure at one, several or each of the joints 20.

In FIG. 1, the industrial robot 10 is exemplified as a seven axis industrial robot but the present disclosure is not limited to this type of robot. An industrial robot according to the present disclosure may comprise at least three joints 20.

Figure 2:
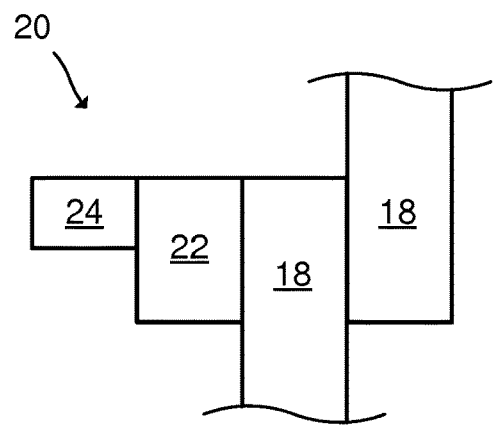
FIG. 2: schematically represents a joint of the industrial robot in FIG. 1.

FIG. 2 schematically represents a joint 20 of the industrial robot 10 in FIG. 1. The joint 20 comprises a gearbox 22 and an electric motor 24 for driving one of the link members 18 relative to the other link member 18 via the gearbox 22. The joint 20 may provide an output torque of 10 kNm. The gearbox 22 comprises a planetary gear train according to the present disclosure. The planetary gear train may be a reduction gear train, for example providing a reduction ratio of 250.

Figure 3:
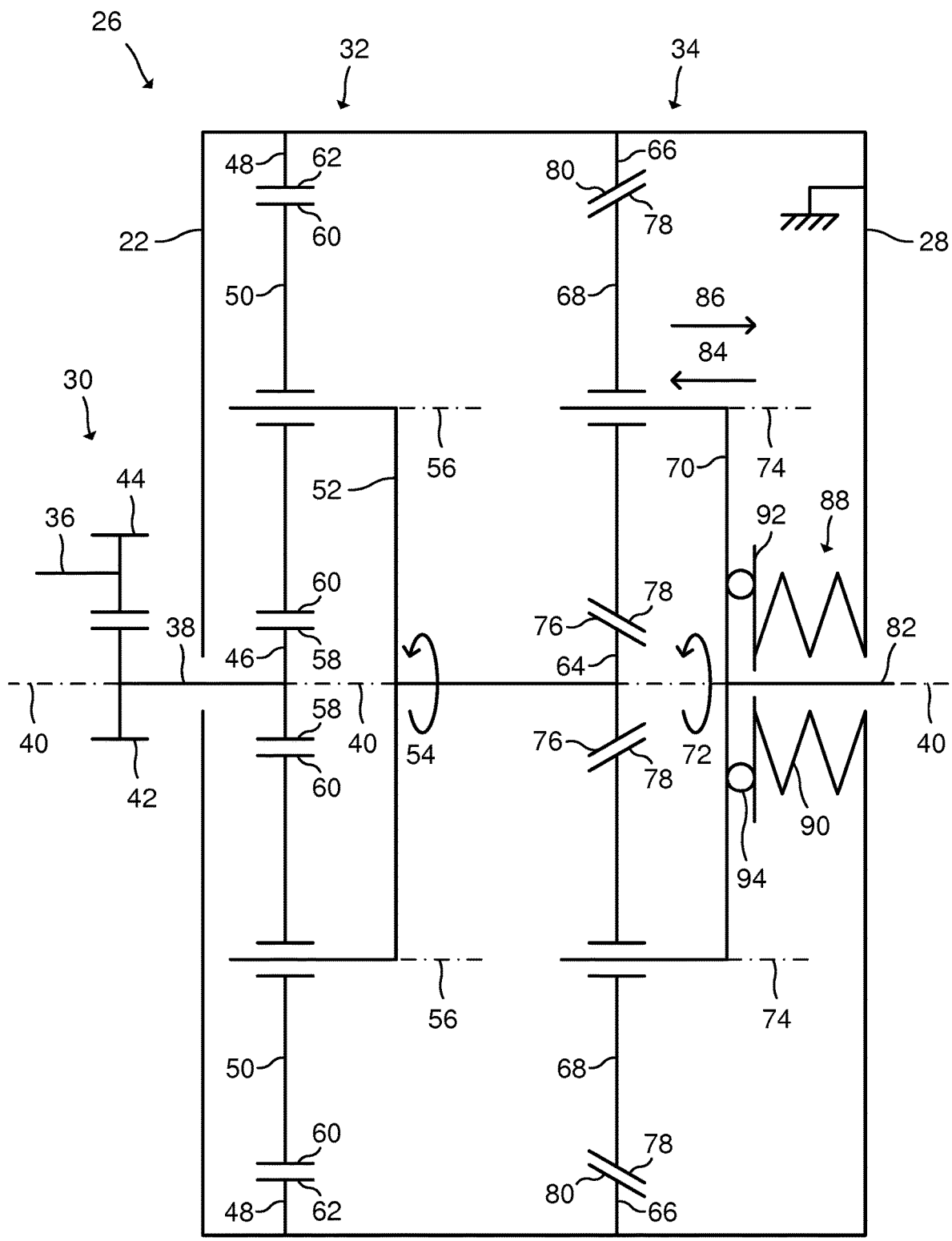
FIG. 3: schematically represents a gearbox of the joint in FIG. 2 comprising a planetary gear train.

FIG. 3 schematically represents the gearbox 22 of the joint 20 in FIG. 2. The gearbox 22 comprises a planetary gear train 26. The gearbox 22 further comprises a housing that constitutes a stationary part 28. The planetary gear train 26 of this example comprises a pre-stage 30, a first planetary gear stage 32 and a second planetary gear stage 34. The pre-stage 30 and/or the first planetary gear stage 32 are optional and may be omitted or replaced with alternative transmissions. For this reason, components of the second planetary gear stage 34 may be referred to without the prefix "second" and components of the first planetary gear stage 32 may also be referred to with the prefix "further".

The pre-stage 30 of the example in FIG. 3 comprises a pinion 36 driven by the electric motor 24, and an input member 38. The input member 38 is rotatable about a central axis 40 of the planetary gear train 26. In this example, the input member 38 is an input shaft. The input member 38 comprises an input member toothing 42 and the pinion 36 comprises a pinion toothing 44 meshing with the input member toothing 42. The pinion toothing 44 and the input member toothing 42 of this example are involute. The pinion toothing 44 and the input member toothing 42 may also be helical. The input member 38 further comprises a first sun gear 46, i.e. a sun gear of the first planetary gear stage 32.

The first planetary gear stage 32 of the example in FIG. 3 comprises the first sun gear 46, a first ring gear 48, a plurality of first planet gears 50 and a first planet carrier 52. The first ring gear 48 is stationary. The first planet carrier 52 is rotatable about the central axis 40 as indicated with arrow 54. In this example, the first planetary gear stage 32 comprises four first planet gears 50, but the first planetary gear stage 32 may comprise an alternative number of first planet gears 50, such as three first planet gears 50. Each first planet gear 50 is rotatable about a first planet axis 56. The first planet carrier 52 rotationally supports the first planet gears 50 for rotation about a respective first planet axis 56.

The first sun gear 46 comprises a first sun gear toothing 58 meshing with a first planet gear toothing 6o of each first planet gear so. The first planet gear toothing 60 of each first planet gear 50 also meshes with a first ring gear toothing 62 of the first ring gear 48.

The first planet carrier 52 of this example is fixed to a second sun gear 64 of the second planetary gear stage 34. Thus, the first sun gear 46 constitutes an input of the first planetary gear stage 32 and the first planet carrier 52 constitutes an output of the first planetary gear stage 32. In this example, the first sun gear toothing 58, the first planet gear toothings 6o and the first ring gear toothing 62 are involute.

The second planetary gear stage 34 comprises the second sun gear 64, a second ring gear 66, a plurality of second planet gears 68, and a second planet carrier 70. The second ring gear 66 is stationary and concentric with the central axis 40. The second planet carrier 70 is rotatable about the central axis 40 as indicated with arrow 72. In this example, the second planetary gear stage 34 comprises four second planet gears 68, but may comprise an alternative number of second planet gears 68, such as three second planet gears 68. Each second planet gear 68 is rotatable about a second planet axis 74. The second planet carrier 70 rotationally supports the second planet gears 68 for rotation about a respective second planet axis 74.

The second sun gear 64 comprises a second sun gear toothing 76 meshing with a second planet gear toothing 78 of each second planet gear 68. The second planet gear toothing 78 of each second planet gear 68 also meshes with a second ring gear toothing 80 of the second ring gear 66. The second planet carrier 70 of this example is fixed to an output member 82, here exemplified as an output shaft. Thus, the second sun gear 64 constitutes an input of the second planetary gear stage 34 and the second planet carrier 70 constitutes an output of the first planetary gear stage 32. In this example, the second sun gear toothing 76, the second planet gear toothings 78 and the second ring gear toothing 80 are constituted by involute toothings. Although FIG. 3 illustrates an output member 82 constituted by an output shaft, the output member 82 may alternatively be constituted by an output flange.

In the example in FIG. 3, each of the pre-stage 30, the first planetary gear stage 32 and the second planetary gear stage 34 is a reduction stage. If the pinion 36 has a relatively high rotational speed, the output member 82 has a relatively low rotational speed. This also means that errors are reduced through the planetary gear train 26 and that the last stage, here the second planetary gear stage 34, is most important when addressing errors.

In the second planetary gear stage 34, each second planet gear toothing 78 is conical and helical. The conicity of the second planet gears 68 defines a conical direction 84. That is, the conical direction 84 points towards an apex of an imaginary cone of which each conical second planet gears 68 forms a conical frustum.

The second planet gear toothings 78 of this example each has a helix angle of approximately 3 degrees and a conicity of approximately 2 degrees. Each of the second sun gear toothing 76 and the second ring gear toothing 80 also has a helix angle of approximately 3 degrees and a conicity of approximately 2 degrees.

The second planet carrier 70 is axially displaceable or floating along the central axis 40. The second planet carrier 70 is allowed to move in the conical direction 84 (to the left in FIG. 3) along the central axis 40, and in a base direction 86 (to the right in FIG. 3) along the central axis 40, opposite to the conical direction 84.

In the example in FIG. 3, each second planet gear 68 is axially locked relative to the second planet carrier 70. That is, the second planet gears 68 are not free to move axially along their associated second planet axes 74 relative to the second planet carrier 70.

The planetary gear train 26 further comprises a carrier forcing device 88. The carrier forcing device 88 is arranged to force the second planet carrier 70 along the central axis 40 in the conical direction 84.

In FIG. 3, the carrier forcing device 88 is constituted by a spring 90, more specifically a disc spring, such as a Belleville washer. The spring 90 is compressed and thereby preloaded such that the spring 90 exerts a pushing force on the second planet carrier 70 in the conical direction 84. As shown in FIG. 3, the spring 90 encircles the central axis 40.

The spring 90 is arranged between the stationary part 28 and the second planet carrier 70. More specifically, the planetary gear train 26 of this example further comprises a carrier plate 92 and a carrier bearing 94. The spring 90 is arranged between the stationary part 28 and the carrier plate 92. The carrier bearing 94 allows the second planet carrier 70 to rotate about the central axis 40 relative to the carrier plate 92.

The spring 90 of the carrier forcing device 88 pushes each second planet gear 68 in the conical direction 84 via the second planet carrier 70. Due to the conicity of the second planet gear toothings 78, the second planet gears 68 are pushed into double flank contact with the second ring gear 66 and the second sun gear 64 when the driving torque is low. This may be the case when a TCP (Tool Center Point) of the industrial robot 10 moves to or from fine points of a movement path. Thus, at low driving torques, the precompression of the spring 90 eliminates backlash between the second sun gear 64 and the second planet gears 68, and between the second planet gears 68 and the second ring gear 66, but also generates friction losses to the planetary gear train 26.

When the second planet gears 68 accelerate, a higher driving torque is transferred. This driving torque in combination with the helical second planet gear toothings 78 generate a force on each second planet gear 68 in the base direction 86. By allowing the second planet carrier 70 to move axially along the central axis 40, the second planet gears 68 move in the base direction 86 until the double flank contact of the second planet gear toothing 78 switches to a single flank contact when accelerating with increased torque. The second planet gears 68 may be said to climb by means of the helical profile of the second planet gear toothings 78. The axial movement of the second planet gears 68 in the base direction 86 causes gaps to be established between the non-working flanks of the second planet gear toothings 78 and the non-working flanks of the second ring gear toothing 80, and between the non-working flanks of the second planet gear toothings 78 and the non-working flanks of the second sun gear toothing 76. Thereby, friction losses are reduced at higher torque, for example when the industrial robot 10 operates outside fine points. One or more stopping structures may be provided to prevent complete separation of the second planet gears 68 from the second ring gear 66 and the second sun gear 64.

When the rotational speeds of the second planet gears 68 decrease during deceleration of the joint 20, the driving torque on the second planet gears 68 decreases. As a consequence, the force exerted by the carrier forcing device 88 on the second planet carrier 70 causes the second planet gears 68 to move in the conical direction 84 until the second planet gears 68 again adopt a double flank contact with the second ring gear 66 and the second sun gear 64. That is, the gaps between associated non-working flanks of the second planet gear toothing 78, the second ring gear toothing 80 and the second sun gear toothing 76, are closed.

The axial force in the base direction 86 generated when the second planet gears 68 are driven has a term from the transferred torque but also term of rotational inertia of the second planet gears 68 that increases with higher rotational speeds.

The axial force in a helical gear contact can be expressed as:

$$F_a = \frac{2T_1}{d_{w1}\cos\alpha_w}\tan\beta_b \qquad (1)$$

where $T_1$ is the driving torque, $d_{w1}$ is the pitch diameter, $\alpha_w$ is the pressure angle and $\beta_b$ is the helix angle.

The helix angle of the second planet gear toothing 78, the second ring gear toothing 80 and the second sun gear toothing 76, and/or the pretension of the spring 90 may thus be configured, for example, in dependence of the intended load to be transferred by the planetary gear train 26, and/or in dependence of at which rotational speed (e.g. of the second planet carrier 70 or the second planet gears 68) the second planet gears 68 should move from a double flank contact to a single flank contact.

The pretension in the spring 90 may also be adjusted such that the backlash is eliminated, or substantially eliminated, when the planetary gear train 26 is driven at lower torque. The backlash of the planetary gear train 26 may be as low as 0.5 arcmin at low torque.

Furthermore, although not illustrated in FIG. 3, the planetary gear train 26 may be hollow. Thus, each of the input member 38, the first planet carrier 52, the second sun gear 64 and the second planet carrier 70 may be made hollow such that for example cables can be fed through the gearbox 22 and the planetary gear train 26 along the central axis 40.

Figure 4:
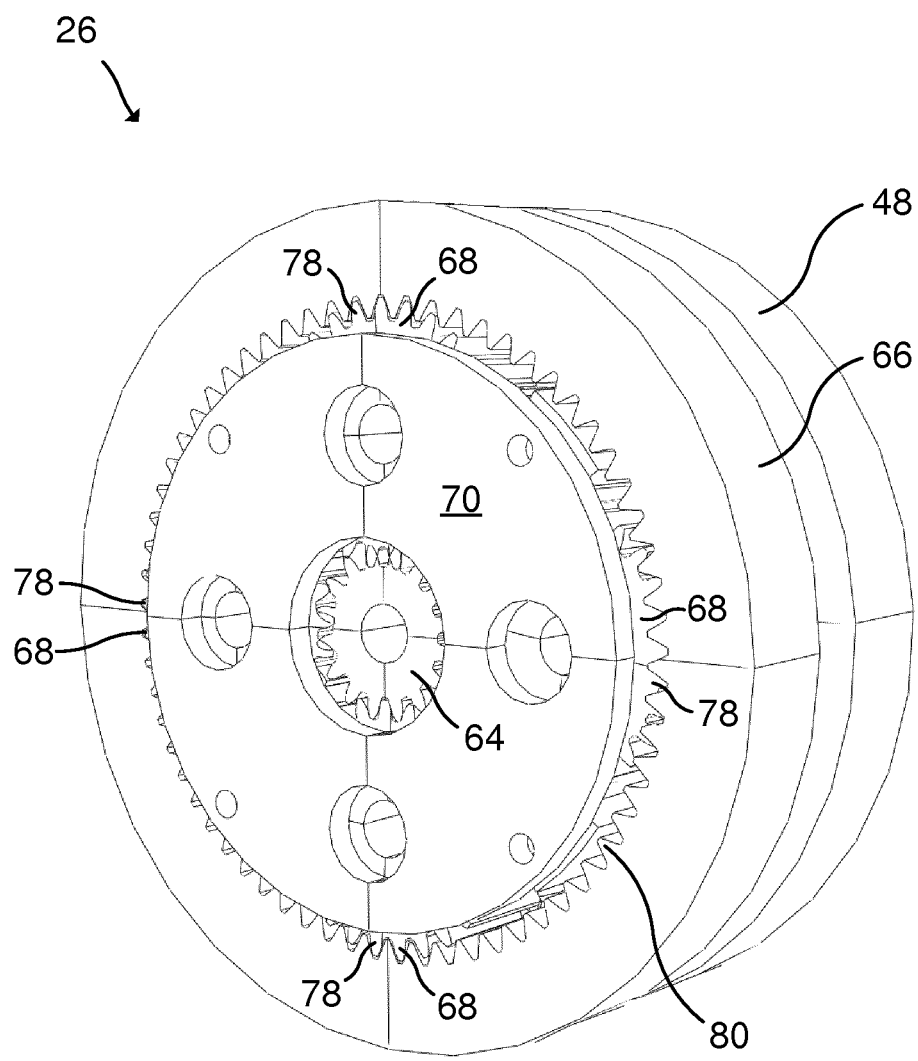
FIG. 4: schematically represents a partial perspective view of the planetary gear train in FIG. 3.

FIG. 4 schematically represents a partial perspective view of the planetary gear train 26 in FIG. 3.

Figure 5:
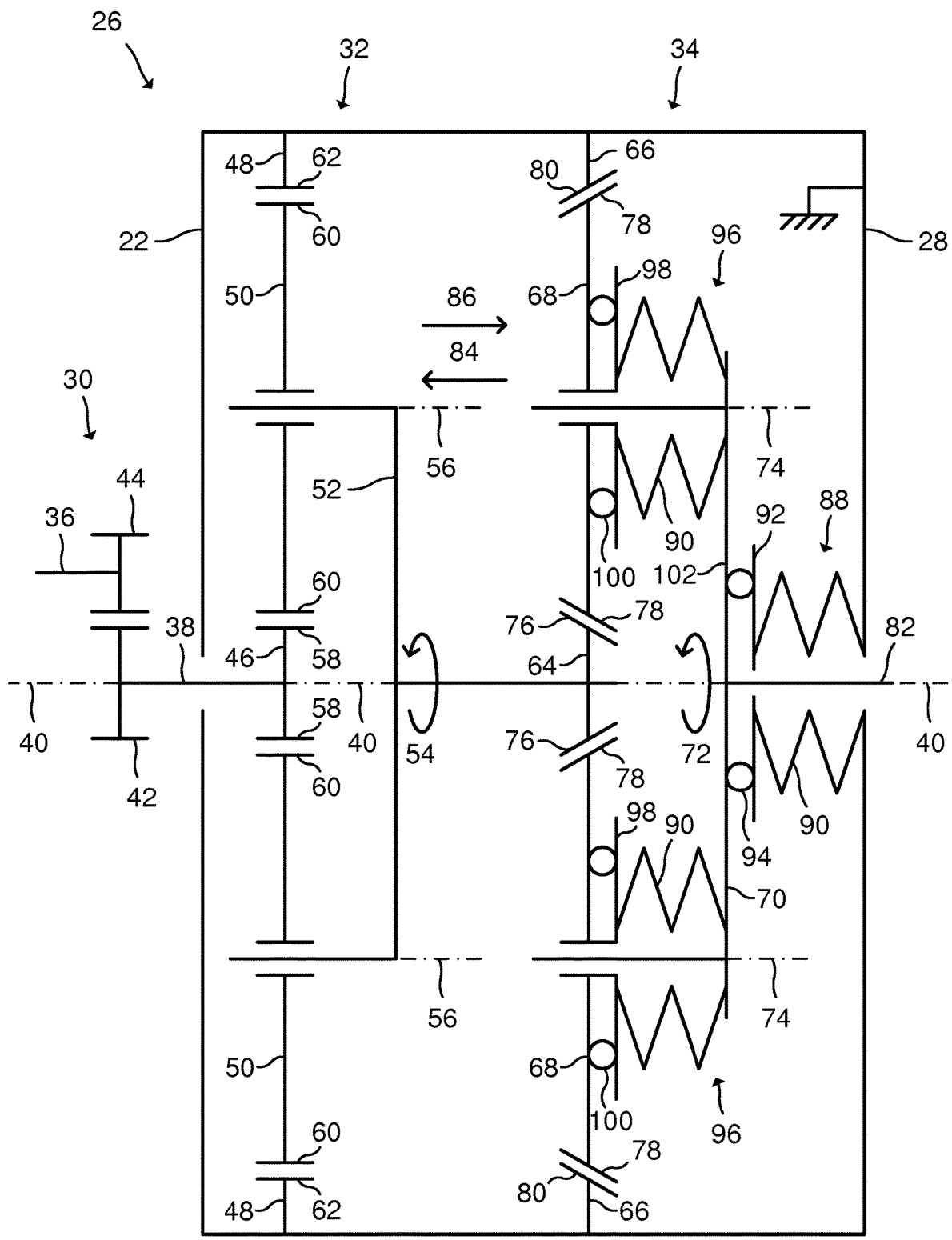
FIG. 5: schematically represents a further gearbox comprising an alternative planetary gear train.

FIG. 5 schematically represents a further gearbox 22 comprising an alternative planetary gear train 26. Mainly differences with respect to FIG. 3 will be described. In FIG. 5, each second planet gear 68 is axially displaceable relative to the second planet carrier 70 along its associated second planet axis 74. Thus, the second planet gears 68 are axially floating.

The planetary gear train 26 in FIG. 5 further comprises a plurality of planet forcing devices 96. Each planet forcing device 96 is associated with one of the second planet gears 68. The planet forcing devices 96 force the associated second planet gear 68 in the conical direction 84. This may in some cases contribute to a more even load distribution between the second planet gears 68.

Each planet forcing device 96 may be of the same type as the carrier forcing device 88. For example, each planet forcing device 96 may be constituted by a spring 90, such as a disc spring, encircling the associated second planet axis 74. As shown in FIG. 5, the planetary gear train 26 of this example further comprises a planet plate 98 and a planet bearing 100 associated with each second planet gear 68. Each spring 90 of the planet forcing devices 96 is arranged between a planet carrier base 102 of the second planet carrier 70 and a planet plate 98 of an associated second planet gear 68. The planet bearings 100 allow the second planet gears 68 to rotate about the respective second planet axis 74 relative to the planet plate 98.

Figure 6:
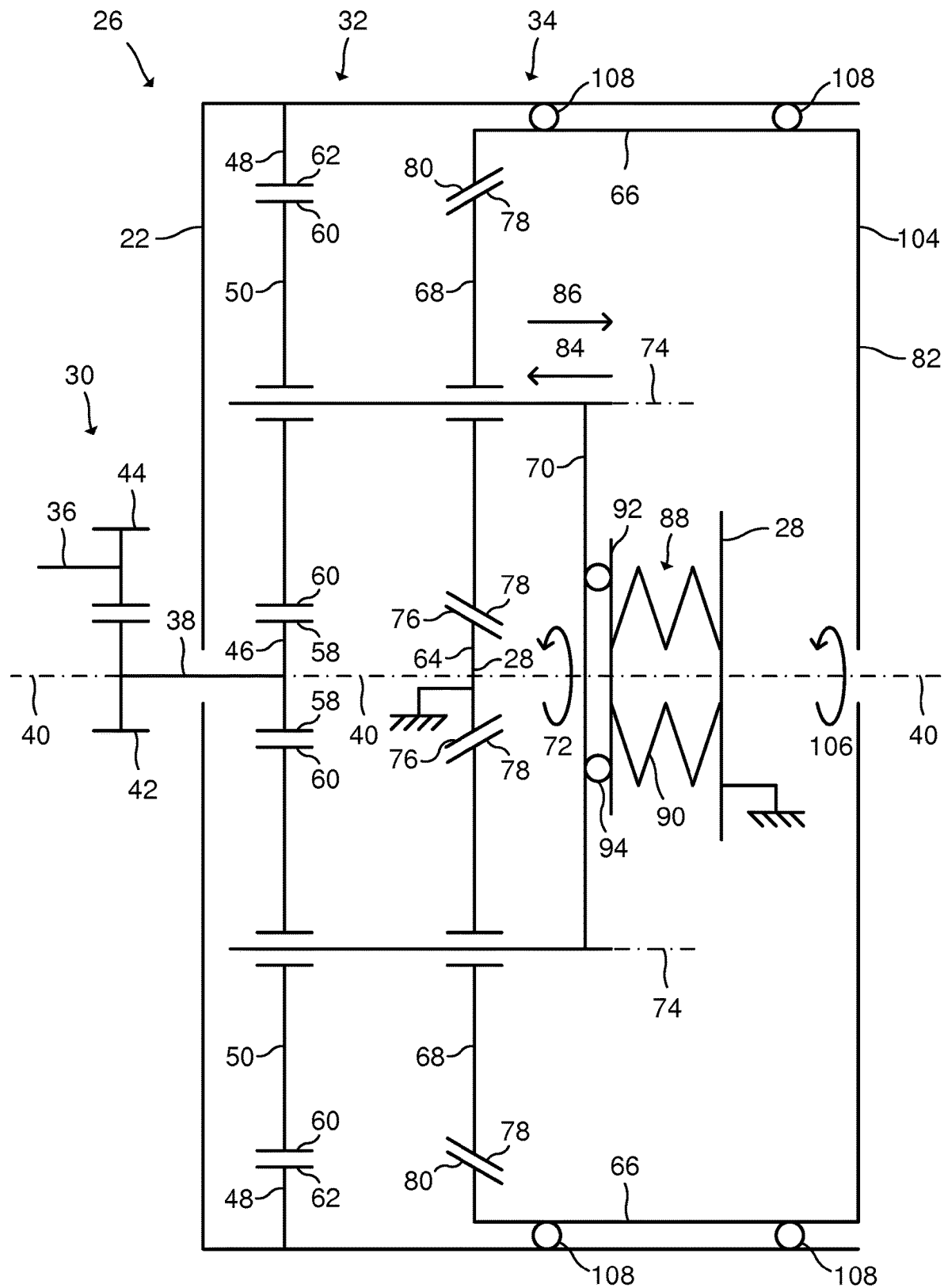
FIG. 6: schematically represents a further gearbox comprising an alternative planetary gear train.

FIG. 6 schematically represents a further gearbox 22 comprising an alternative planetary gear train 26. Mainly differences with respect to FIG. 3 will be described. The planetary gear train 26 in FIG. 6 comprises only one planet carrier 70. The planet carrier 70 rotationally supports the first planet gears 50 and the second planet gears 68 for rotation about respective common planet axes 74. Thus, the first planetary gear stage 32 and the second planetary gear stage 34 comprise a common planet carrier 70.

Furthermore, the second sun gear 64 is stationary. The second ring gear 66 is rotatable about the central axis 40. The second ring gear 66 is fixed with an output flange 104. The output flange 104 is rotatable about the central axis 40 as indicated by arrow 106. The second ring gear 66 is rotationally supported by bearings 108. Thus, in the example in FIG. 6, the output flange 104 of the second ring gear 66 constitutes the output member 82. The input of the second planetary gear stage 34 is provided on the planet carrier 70.

Figure 7:
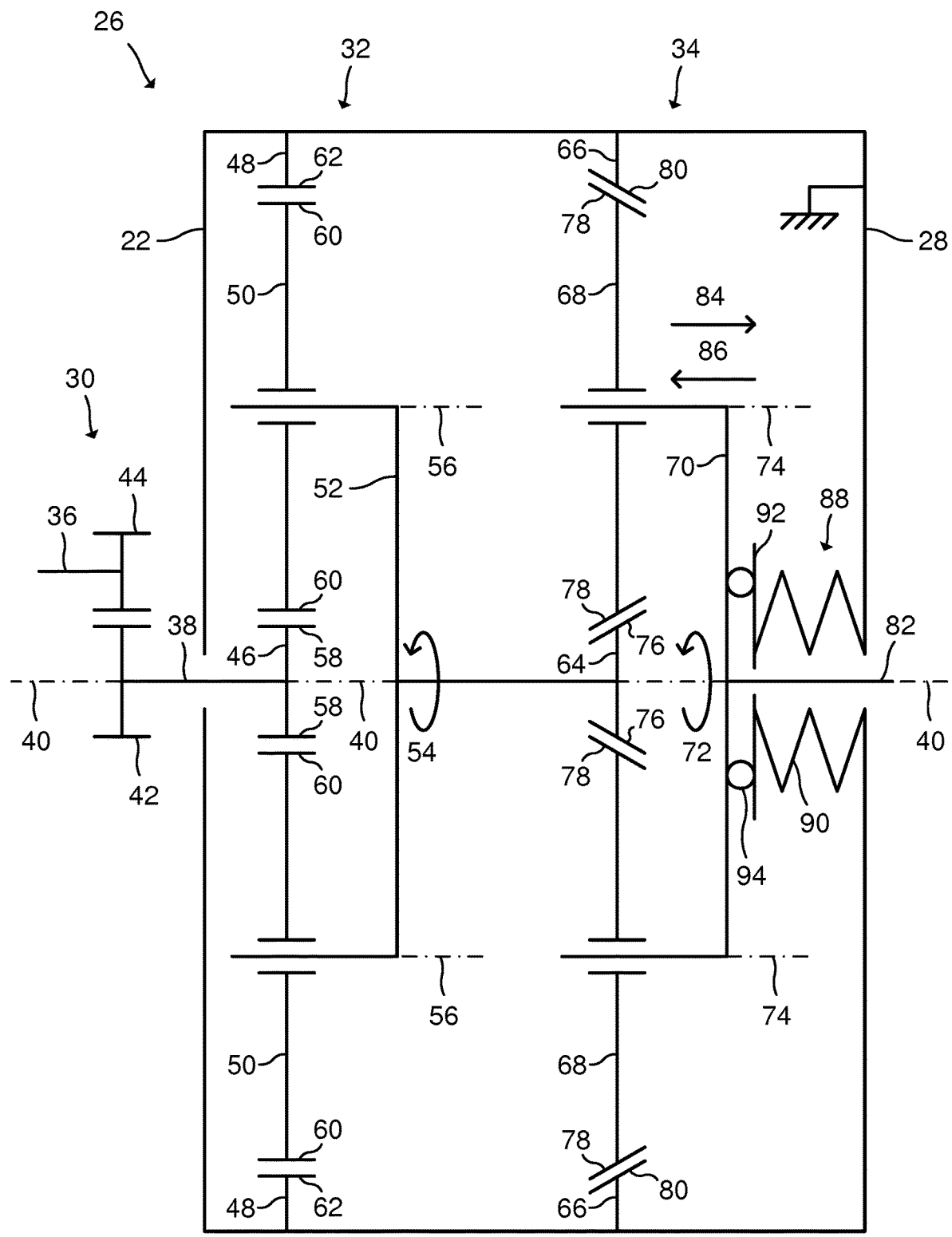
FIG. 7: schematically represents a further gearbox comprising an alternative planetary gear train.

FIG. 7 schematically represents a further gearbox 22 comprising an alternative planetary gear train 26. Mainly differences with respect to FIG. 3 will be described. The conicity of the second planet gears 68 are reversed in comparison with FIG. 3 such that the conical direction 84 is defined in the opposite direction. Also the conicities of the second ring gear 66 and the second sun gear 64 are reversed.

The carrier forcing device 88 in FIG. 7 is also constituted by a spring 90, more specifically a disc spring, such as a Belleville washer. The spring 90 is however extended and thereby preloaded such that the spring 90 exerts a pulling force on the second planet carrier 70 in the conical direction 84.

The planet forcing devices 96 according to FIG. 5 may also be applied to each of the planetary gear trains 26 in FIGS. 6 and 7. Furthermore, the switched conicities according to FIG. 7 may also be applied to the planetary gear train 26 in FIG. 6.

While the present disclosure has been described with reference to exemplary embodiments, it will be appreciated that the present invention is not limited to what has been described above. For example, it will be appreciated that the dimensions of the parts may be varied as needed.

The invention claimed is:

1. A planetary gear train comprising:
a ring gear defining a central axis;
a plurality of planet gears, each planet gear being rotatable about a respective planet axis and meshing with the ring gear, and each planet gear including a conical and helical planet gear toothing defining a conical direction;
a planet carrier rotationally supporting the planet gears for rotation about the planet axes, the planet carrier being allowed to move along the central axis; and
a carrier forcing device arranged to force the planet carrier along the central axis in the conical direction.

2. The planetary gear train according to claim 1, wherein the planet gear toothing has a helix angle of 0.5 to 8 degrees.

3. The planetary gear train according to claim 2, wherein the carrier forcing device includes a spring.

4. The planetary gear train according to claim 2, further comprising a stationary part, and wherein the carrier forcing device is arranged between the stationary part and the planet carrier.

5. The planetary gear train according to claim 2, wherein the helix angle of the planet gear toothing is 1 to 5 degrees.

6. The planetary gear train according to claim 1, wherein the carrier forcing device includes a spring.

7. The planetary gear train according to claim 6, wherein the spring encircles the central axis.

8. The planetary gear train according to claim 7, wherein the spring is a disc spring.

9. The planetary gear train according to claim 7, wherein the spring is preloaded.

10. The planetary gear train according to claim 6, wherein the spring is a disc spring.

11. The planetary gear train according to claim 6, wherein the spring is preloaded.

12. The planetary gear train according to claim 1, further comprising a stationary part, and wherein the carrier forcing device is arranged between the stationary part and the planet carrier.

13. The planetary gear train according to claim 1, wherein at least one of the planet gears is axially displaceable along its planet axis relative to the planet carrier, and wherein the planetary gear train further comprises at least one planet forcing device arranged to force the at least one axially displaceable planet gear along the planet axis in the conical direction.

14. The planetary gear train according to claim 1, wherein the ring gear is rotatable about the central axis.

15. The planetary gear train according to claim 1, further comprising a sun gear meshing with the planet gears.

16. The planetary gear train according to claim 1, wherein the planetary gear train comprises a first planetary gear stage and a second planetary gear stage.

17. The planetary gear train according to claim 16, wherein the second planetary gear stage comprises the sun gear, and wherein the sun gear is fixed with a planet carrier of the first planetary gear stage.

18. The planetary gear train according to claim 16, wherein the planet gears comprising the conical and helical planet gear toothing are provided in the second planetary gear stage.

19. A gearbox for an industrial robot, the gearbox comprising a planetary gear which includes:
- a ring gear defining a central axis;
- a plurality of planet gears, each planet gear being rotatable about a respective planet axis and meshing with the ring gear, and each planet gear including a conical and helical planet gear toothing defining a conical direction;
- a planet carrier rotationally supporting the planet gears for rotation about the planet axes, the planet carrier being allowed to move along the central axis; and
- a carrier forcing device arranged to force the planet carrier along the central axis in the conical direction.

20. An industrial robot comprising a planetary gear train or a gearbox, including:
- a ring gear defining a central axis;
- a plurality of planet gears, each planet gear being rotatable about a respective planet axis and meshing with the ring gear, and each planet gear including a conical and helical planet gear toothing defining a conical direction;
- a planet carrier rotationally supporting the planet gears for rotation about the planet axes, the planet carrier being allowed to move along the central axis; and
- a carrier forcing device arranged to force the planet carrier along the central axis in the conical direction.

* * * * *